United States Patent [19]

Hoekstra et al.

[11] Patent Number: 5,754,548
[45] Date of Patent: May 19, 1998

[54] INTERCONNECTION OF LOCAL COMMUNICATION BUS SYSTEM

[75] Inventors: Jelle Hoekstra; Bernard Van Steenbrugge, both of Eindhoven, Netherlands

[73] Assignee: U.S. Philips Corporation, New York, N.Y.

[21] Appl. No.: 803,646

[22] Filed: Feb. 21, 1997

Related U.S. Application Data

[63] Continuation of Ser. No. 394,977, Feb. 27, 1995, abandoned.

[30] Foreign Application Priority Data

Mar. 31, 1994 [GB] United Kingdom .................. 9406477

[51] Int. Cl.$^6$ .................. H04L 12/66; H04B 1/20
[52] U.S. Cl. .................. 370/402; 370/465; 395/309
[58] Field of Search .................. 370/401, 402, 370/419, 420, 421, 464, 465, 466; 340/825.05, 825, 54; 395/309, 200.14, 200.15, 200.02; 364/240.8, 240.9, 242.94, 940.81, 937

[56] References Cited

U.S. PATENT DOCUMENTS

| | | | |
|---|---|---|---|
| 4,872,162 | 10/1989 | Tanaka et al. | 370/402 |
| 5,088,032 | 2/1992 | Bosack | 370/401 |
| 5,117,430 | 5/1992 | Berglund | 370/408 |
| 5,237,566 | 8/1993 | Brand et al. | 370/426 |
| 5,283,571 | 2/1994 | Yang et al. | 370/245 |
| 5,323,388 | 6/1994 | Chang et al. | 370/353 |
| 5,371,852 | 12/1994 | Attanasio et al. | 370/401 |
| 5,412,656 | 5/1995 | Brand et al. | 370/428 |
| 5,440,698 | 8/1995 | Sindhu et al. | 370/462 |
| 5,473,575 | 12/1995 | Farmwald et al. | 365/190 |
| 5,490,152 | 2/1996 | Gregg et al. | 370/471 |
| 5,513,327 | 4/1996 | Farmwald et al. | 395/309 |

OTHER PUBLICATIONS

International Standard, IEC 1030, First Edition 1991, pp. 49–53.

IEEE Transactions on Consumer Electronics vol. 36, No. 3, Aug. 1990 C. Ciocan, The Domestic Digital Bus System—A Maximum of Control Convenience in Audio Video pp. 619–622.

*Primary Examiner*—Benedict V. Safourek
*Assistant Examiner*—Seema S. Rao
*Attorney, Agent, or Firm*—Anne E. Barschall

[57] ABSTRACT

In a local communication system comprising a number of devices (14,16) interconnected by a first data bus (20) supporting a first set of communication protocols, and at least one further device (10) connected to a second bus (12) not supporting those protocols, a gateway device (18) is provided linking the first and second data buses enabling communications therebetween. The first set of protocols specifies a maximum time for response by a first device to a request sent by a second device. When a request is sent from a device (14) on the first bus to the further device (10), the gateway (18) times the request and, if no response is received from the further device within the specified maximum response time, the gateway (18) generates and sends a temporary response to the requesting device (14). The system may comprise two or more clusters of devices, each being linked to the further bus (12) by respective gateway devices (18,22).

19 Claims, 6 Drawing Sheets

INTERCONNECTION OF LOCAL COMMUNICATION BUS SYSTEM

This is a continuation of application Ser. No. 08/394,977, filed Feb. 27, 1995 now abandoned.

The present invention relates to a local communication system comprising a plurality of stations interconnected for the communication of messages via a first data bus and in accordance with a first set of communication protocols, at least one further station not supporting the said protocols, and a gateway device linking the first data bus and further station and operable to enable communications therebetween. The invention further relates to apparatus for use with such a system.

One known set of communications protocols is the Domestic Digital Bus (D2B) Standard, standardised by the International Electrotechnical Commission, Geneva, Switzerland, and issued under reference IEC 1030. D2B consists of a package of communication protocol specifications and system requirements, defining the way in which consumer electronics products can access and control each others functions via the Domestic Digital Bus. D2B is a general purpose control bus which also supports the transfer of limited amounts of digital data. Currently the main application area is Audio/Video (AV) equipment.

With all such domestic equipment interconnection schemes, there is a problem of connection to apparatus not supporting the communications protocols of the scheme. As an example, a user may have a music system comprising interconnected units such as a compact disc (CD) player, amplifier, tuner and cassette player which communicate with each other using a first set of communications protocols, together with an audio visual system comprising for example a television, video recorder and satellite receiver which communicate using a second set of protocols. In the absence of a certain degree of compatibility with existing systems, a user be faced with having to replace many items at one time. One way to reduce this problem is to provide a gateway device which supports two or more sets of communications protocols and can "translate" messages between them.

A D2B can be used as a subsystem within a home electronic bus (HEB) system, and the IEC Standard 1030 specifies in Section 11 thereof certain minimum requirements for a gateway device linking the D2B to the HEB. A problem which occurs with gateway devices, relates to the timing of messages and in particular the time within which any device requesting information from another may expect to receive a response. When a first device receives a request from another device connected to its own local bus system, it should make an answer available as quickly as possible: a maximum response time may be specified such that no device becomes "jammed" whilst waiting for a response from a device which for some reason is unable to answer. However, in the present situation of gateway communication, such as from one D2B cluster to another via an intermediate bus system not supporting D2B protocols, an inevitable and unpredictable delay may occur due to the delay of transmission via the intermediate bus.

In accordance with the present invention there is provided a local communications system of the type set forth in the opening paragraph wherein the first set of communications protocols specifies a maximum time for reply by a first station to a message sent by a second station, and wherein when a message requiring a response is passed between a station of the first bus system and the said further station via the gateway device, the gateway device is configured to generate and send a temporary response to the message originating station, within a predetermined period less than the specified maximum response time, pending arrival of a response from the station receiving the message, and subsequently passes the said response on its arrival. Preferably, the gateway device includes memory means within which a record of a message passed is stored.

Following the sending of a temporary response to a first requesting station, the gateway device is preferably operable to pass messages from other requesting devices, with the memory means maintaining a record of the first message.

The gateway device may support requests from stations connected to the first data bus for information regarding the identity of further gateway devices beyond the gateway and be operable to pass messages to further stations via such further gateway devices, including messages verifying or detecting the presence of stations beyond further gateways.

Additionally, the gateway device may be operable to emulate, to each station connected to the first data bus and in accordance with the first set of communications protocols, the behaviour of the or each further station linked to the first bus through the gateway device.

Where the system comprises two or more clusters of stations, each cluster comprising a plurality of stations interconnected by a respective data bus and communicating within the cluster in accordance with respective sets of communications protocols, the clusters may be linked to each other by a further communications bus supporting a further set of communications protocols, with each being linked to the further bus by a respective gateway device.

By providing a temporary response, the gateway device handles any inconsistencies of timing with the temporary response meeting the requirements for a response to be received within a maximum period.

Further features and advantages of the present invention will be apparent from reading of the claims and the following description of preferred embodiments of the present invention, now described by way of example only and with reference to the accompanying drawings in which:

The following description will cover the enabling by a gateway device embodying the present invention of access by devices on a first bus system (referred to hereinafter as an X-bus) to the functions available within a D2B system and vice versa, via the gateway device.

Figure 1:
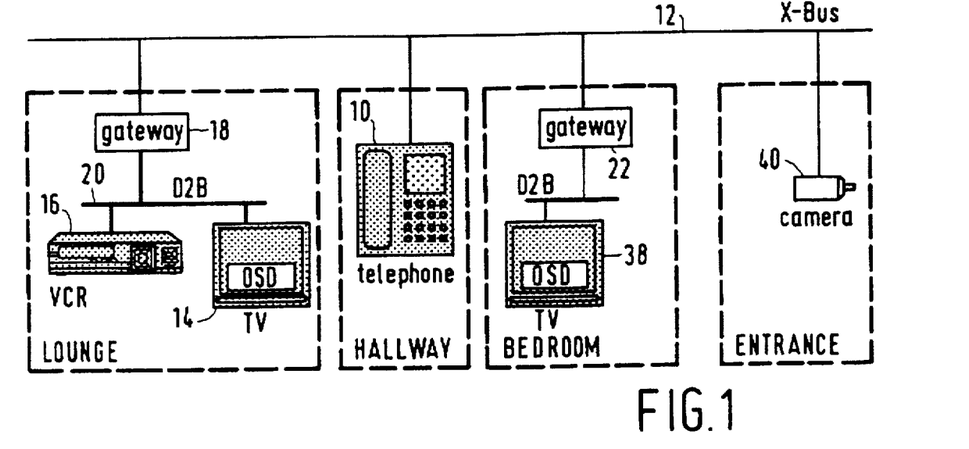
FIG. 1 schematically represents a domestic audio/visual application using a number of interconnection buses.

An example of such an application, as shown in FIG. 1, comprises a telephone 10, attached to an X-bus 12 and using the on-screen display (OSD) function of a television 14 within a D2B cluster (of which television 14, a VCR 16 and gateway 18 connected via D2B 20 are shown). The telephone 10 could use the OSD function to display a message, perhaps to announce that there is a call and give details of the caller. Alternatively, the telephone 10 may be used to program the VCR 16 of the D2B cluster from a remote location.

As also shown in FIG. 1, more than one D2B cluster may be connected via the X-bus 12 with each cluster being connected thereto via a respective gateway 18,22. Accordingly, the gateways 18,22 enable application messages to be sent not only between devices in a D2B cluster and devices on the X-bus, but also between devices in separate D2B clusters.

The gateway 18 provides a logical interface between the D2B and X-Bus which manages the transfer of messages from D2B to X-Bus transparently.

Figure 2:
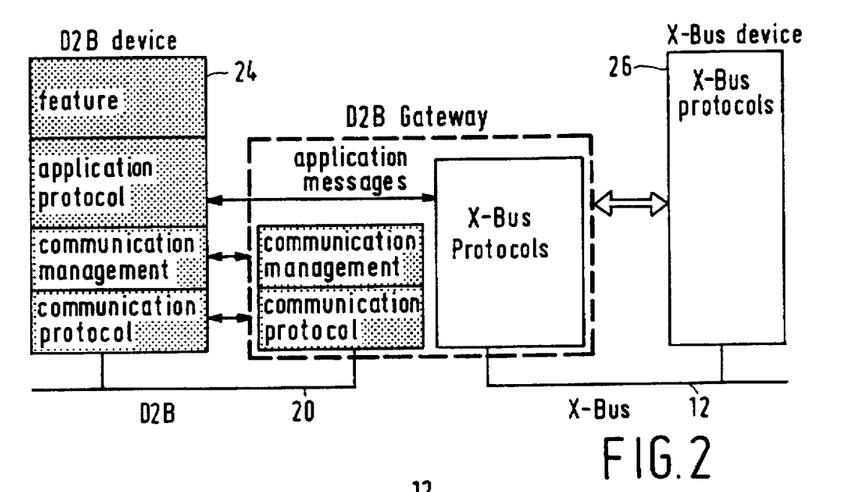
FIGS. 2 and 3 are block schematic representations of a gateway device linking two data buses.

As shown in FIG. 2, the gateway 18 is in charge of the protocol interface between D2B and X-Bus, and its functionalities are concerned with the communication between D2B and X-Bus, with a message from a D2B device 24 translated into an X-Bus message by the X-Bus protocol of the gateway, and transferred to an X-Bus device 26. Where the X-Bus device is a further D2B cluster (as in FIG. 1), the X-Bus message is translated into D2B protocol by the gateway 22 connecting the further cluster to the X-Bus 12.

Figure 3:
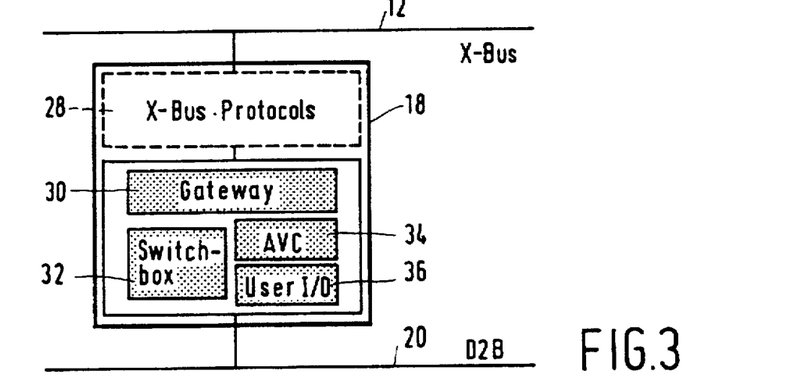

FIG. 3 shows the D2B side of the gateway device 18, with a gateway subdevice 30 providing an interface to the X-Bus protocols 28 and in charge of the basic role of executing transparent message communication with a device outside of the cluster. The gateway subdevice 30 is necessary to permit basic applications such as controlling simple devices via the D2B gateway. For more complex applications, the device containing the gateway 30 may include other subdevices such as a switchbox subdevice 32 to make signal connections to and from a D2B cluster for audio/video signal distribution. For other applications such as central control from the gateway, an AVC subdevice 34 and a user I/O subdevice 36 may be required within the gateway device.

If the gateway is connected to more than one network, for example X-Bus A and X-Bus B, then the gateway subdevice 30 provides separate protocol interfaces for each network.

Referring again to FIG. 1, when a device or subdevice in one D2B cluster (in this case the television 38) wishes to send an application message to a device or subdevice in another D2B cluster (a playback command to VCR 16), the application on the source device assembles the gateway routing information together with commands and requests into an application message which is placed in a D2B message. The devices' communication facilities send the D2B message to the gateway 22 within its own cluster. The gateway routing information in the D2B message contains a gateway number which identifies the gateway 18 of a D2B cluster to which the message should be sent.

The first cluster gateway 22 uses this gateway number to pass the contents of the message, via the connecting X-Bus 12 to the gateway 18 of the destination cluster. When the message reaches the gateway 18 of the receiving cluster, the gateway 18 replaces its own number in the routing information with that of the gateway 22 of the originating cluster such that the device or subdevice receiving the message can identify its originating cluster. The receiving gateway 18 then uses the altered application message to generate a new message conforming to D2B protocols for passage via D2B 20 to its destination device or subdevice.

When a device or subdevice in one D2B cluster wishes to send an application message to a device on the X-Bus (which device supports messages from the D2B cluster device), such as television 14 sending control commands to security camera 40, television 14 assembles the gateway routing information together with commands and requests into an application message, which is placed in a D2B message. In this instance, the gateway routing information contains the gateway number of the gateway 18 within the originating cluster. The televisions network communication facilities send the D2B message to the identified cluster gateway 18 for transmission over the X-Bus to the camera 40.

When a device on the X-Bus wishes to send a message to a device in a D2B cluster, the message is sent via X-Bus to a gateway 18 for that cluster where a D2B message identifying the receiving gateway is assembled and then passed over the D2B to the destination device e.g. VCR 16.

Figure 4:
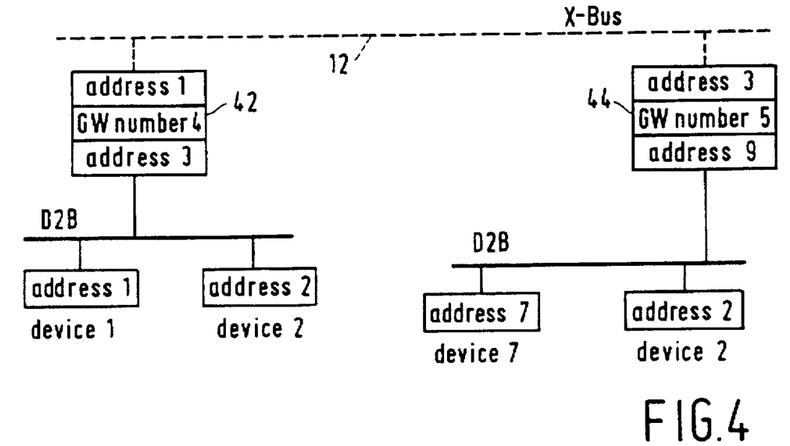
FIG. 4 illustrates linking of two local data network clusters.

On each bus, each device has an address. Gateway devices therefore have two addresses, one for each bus to which they are attached. In the example shown in FIG. 4, two gateway devices 42,44 for respective D2B clusters are connected to X-Bus 12. It will be understood that in this example, any relationship between the gateway number, D2B address and X-Bus address is strictly coincidental.

Suitably a limit of 8 gateway devices connected to a single D2B bus system is imposed, with the D2B addresses for the gateways as follows:

TABLE 1

| bit 11 | ... | bit 0 | bit 11 | ... | bit 0 |
|--------|-----|-------|--------|-----|-------|
| 0000 | 10110 | 000('0B0'H) | 0000 | 11110 | 000('0F0'H) |
| 0000 | 10110 | 001('0B1'H) | 0000 | 11110 | 001('0F1'H) |
| 0000 | 10111 | 000('0B8'H) | 0000 | 11111 | 000('0F8'H) |
| 0000 | 10111 | 001('0B9'H) | 0000 | 11111 | 001('0F9'H) |

The address of the D2B gateway device is specified in the Communication Telephony (CT) service type area (service type specified as '0000'H).

A further limit, of only one gateway subdevice within a device on D2B, is imposed. The gateway subdevice address is allocated in the CT service area and specified as '0B0'H— as the first entry in Table 1 above.

For a D2B device, only one address is allowed. The device address of the gateway is determined by the main functionality of the device, which is implementor defined. If the gateway is a stand-alone gateway (that is to say not as a subdevice of a D2B AV device), one of the eight gateway addresses is allocated to it. When a gateway is implemented as one of the subdevices in an AV device, the device may be defined with an AV device address. If the gateway subdevice is implemented in for example a television set with other subdevices such as a monitor subdevice, a tuner subdevice, a switchbox subdevice and others, the device containing the gateway subdevice will be identified by the video monitor subdevice, which is the main function of that device. If a gateway subdevice is implemented in an X-Bus device such as a room controller or telephone, for controlling D2B devices with D2B protocols, an AVC subdevice is necessary, even though the X-Bus device has no particular AV function. In this case, an AVC device address is allocated to the X-Bus device.

Each gateway subdevice is allocated a 4-bit encoded gateway number. In a system which consists of a D2B cluster and an X-Bus connected via a gateway, a maximum of 16 gateways are permitted. Every gateway either knows or can determine all the gateways which are connected to either of the busses it connects. The gateway number is used by a gateway subdevice to logically identify the known gateways. It is used when a message is going to be sent from one network to another via a gateway. Each gateway needs to number its known gateways and store them.

Figure 5:
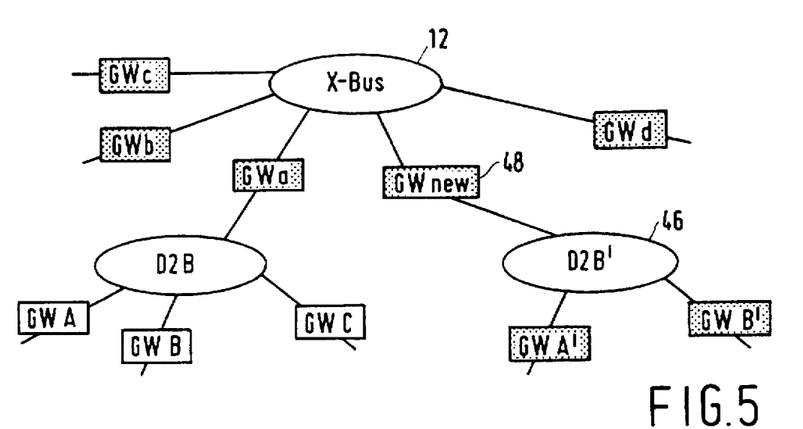
FIG. 5 illustrates gateway numbering in a multiple cluster network system.

In FIG. 5, a cluster 46 (D2B') is going to be connected to X-Bus 12 via gateway 48 (GWnew). After connection to X-Bus, gateway GWnew needs to know its possible gateways on both X-Bus and cluster D2B', which are gateways GWa to GWd on X-Bus and $GW_{A'}$ and $GW_{B'}$ on D2B'.

For gateways on X-Bus, the X-Bus side of the gateway GWnew collects addresses of the gateways on X-Bus and informs the (D2B side) gateway subdevice of them. The X-Bus side of the gateway needs to have a table of the allocated gateway numbers and the X-Bus address of each gateway wherein GWnew and GWa to GWd (all X-Bus addresses) are respectively numbered 1 to 5. For gateways on D2B', the gateway subdevice in GWnew investigates whether there is/are any other gateway(s) on D2B' and, if there are any, it stores the address of the/each such gateway. In the present example, D2B' addresses $GW_A$ and $GW_B$, are stored in the table as numbers 6 and 7 respectively.

When a message is going to be transferred from a device in D2B' to X-Bus via GWnew, the gateway translates the gateway number to the corresponding X-Bus address and transfers the received message to it. When a message is sent from X-Bus and is going to be transferred to D2B', the gateway subdevice in GWnew translates the gateway number to the corresponding D2B address and transfers the received message to the device.

In the same way, GWa may have its own possible gateway numbers independently from any other gateway numbers such that, for GWa the table gives GWa to GWd and GWnew (all X-Bus addresses) as 1 to 5 respectively and $GW_A$ to $GW_C$ (all D2B addresses) as 6 to 8 respectively.

The basic functions of the gateway subdevices are to execute the routing command and set up the routing of the messages to the network beyond the gateway, and to receive a message from the network beyond the gateway and send it the D2B device with a routing command which specifies the routing information.

The details of the routing command will be described in greater detail hereinafter. In order to execute these functions, in addition, the gateway must also have the following (necessary for gateway communication):

Cluster management to provide the device with the capability to get necessary information for communication with a device outside of its cluster;

Timing management to guarantee proper communication timing within a D2B cluster according to D2B communication management protocols.

In remote AV applications, it may be needed to distribute signals via a gateway. In order to make it possible to transmit an AV signal from one cluster to another cluster or between the D2B and the X-Bus, the D2B gateway may optionally have:

A signal distribution function executed by a gateway subdevice acting as an AV source or destination and a switchbox subdevice to make signal connections in the D2B cluster(s).

In the following paragraphs, these functions of cluster management, timing management and signal distribution functions are described in greater detail.

Cluster Management

Within the D2B cluster each device is able to read property memories of other devices. For example a VCR is able to send requests to other devices to find out which one can display a picture. In the same way, the configuration of a cluster can be gathered by the gateway.

For an application using the devices in different D2B clusters, a device in one cluster may need to know whether the requested functionality is available in other clusters and to which device in the other cluster it should send a message. To obtain this information, the interested device may ask with a request message from one cluster to another via a gateway. In order to communicate via a gateway, the device needs to know the gateway numbers, the addresses of devices in the remote cluster and the addresses of the subdevices in each remote device, to be used in the routing command.

Figure 6:
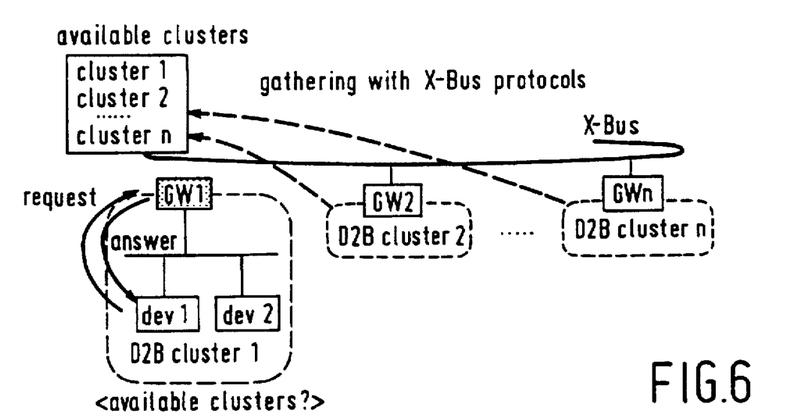
FIG. 6 schematically illustrates the determination by a first gateway device of numbers of other gateway devices.

For a device which is going to communicate with a device in a remote cluster, it is necessary to know which other D2B clusters are available. Each gateway on X-Bus needs to get and store this information before gateway communication is required. How to gather this information is implementor defined and based on the X-Bus protocols, and the interested device can ask the gateway to send this information with an "available clusters?" request. The gateway which receives the request returns the gateway numbers of the available gateways belonging to the X-Bus, as shown for gateway GW1 in FIG. 6.

In D2B a device can discover the configuration of other devices conforming to the protocol and connected to the bus. The configuration (i.e. the number of subdevices and the address of each) may be determined by an interested device sending a <number of subdevice?> request. Similarly, a device in a first D2B cluster can discover the configuration of a device in a second D2B cluster by sending the request via X-Bus.

Figure 7:
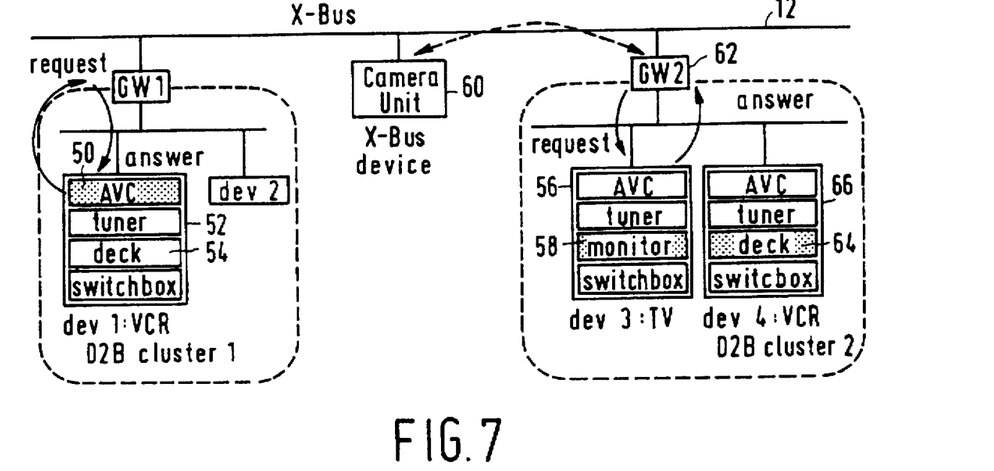
FIG. 7 represents the determination by a device connected to a first gateway of the configuration of a device connected to a second gateway.

FIG. 7 illustrates the obtaining of remote cluster and device configuration info in an example system. Supposing that the AVC subdevice of VCR 52 in the D2B cluster 1 wants to know the device which can display the video signal of the deck subdevice 54 in the D2B cluster 2. Firstly, the AVC 50 tries to find the TV 56 in the remote cluster. The AVC 50 sends the request to the remote cluster with a routing command followed by the monitor device as a destination address. The TV 56 with a monitor device address in the remote cluster answers for this request by sending the number of its subdevices and the address of each of them. Then the AVC subdevice in the local cluster can know the necessary address information of which it should communicate for its application (in this case the monitor subdevice 58).

For the communication from a device on X-Bus, such as camera unit 60 (FIG. 7), to a device in the D2B cluster, the X-Bus device needs to know to whom it should send a message. Supposing that the camera unit 60 on the X-Bus 12 wants to send a video signal to the D2B device which can display the picture of the video signal on the display facility: in effect the camera wishes to know whether there is a TV in the D2B cluster. Firstly, the camera 60 sends a message to request device configuration with a monitor device address as a destination address. In this sequence, communication between the camera 60 and the X-Bus side gateway subdevice of the gateway device 62 of the cluster is executed with the X-Bus protocols. The X-Bus side gateway translates a received X-Bus format message into the appropriate D2B message (the <number of subdevices?> request), and passes it to the D2B side gateway subdevice of gateway 62. The gateway subdevice sends the request to the monitor subdevice 58 following a routing command and its operand. If an answer is obtained properly from the D2B device, the gateway subdevice passes it to the X-Bus side gateway subdevice which then transfers it to the camera unit 60 using the X-Bus communications protocols.

In addition, if the camera unit 60 wants to send its video signal to the device which has a recording facility, it can investigate whether there is a device with such a facility in the D2B cluster in the same way by sending a message to request device configuration with the address of a deck device as a destination address. In this instance the address for the deck subdevice 64 of VCR 66 will be returned.

If a device in the D2B cluster wants to know the configuration of a device on the X-Bus, it is obtained in the same way with requests being translated between protocols at the gateway.

Timing Management:

When a subdevice receives a request, it should make an answer available as quickly as possible. However, in the present situation of gateway communication, such as from one D2B cluster to another, an inevitable and unpredictable delay may occur due to the delay of transmission via the X-Bus. The timing management by the gateway subdevice is executed by providing a temporary answer to the device which has sent the request to a device within another cluster.

Figure 8:
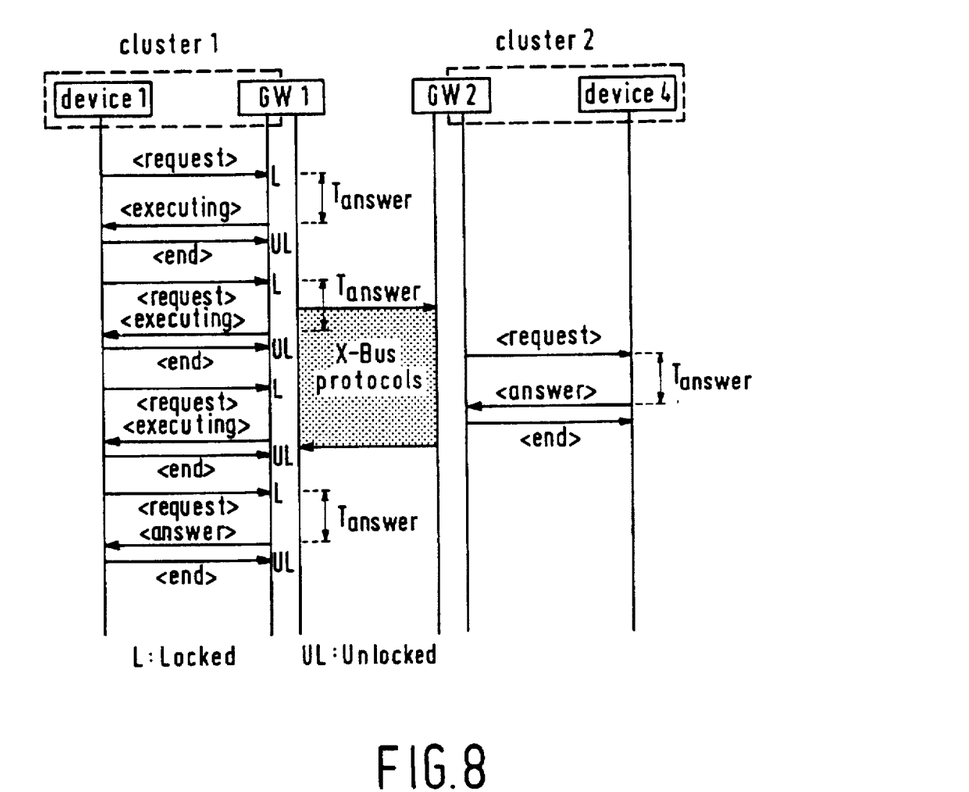
FIG. 8 is a timing diagram illustrating gateway timing management.

Referring again to FIG. 7 and also to the timing diagram of FIG. 8, it is assumed that device 1 in cluster 1 wants to get property info from device 4 in cluster 2 using a request and answer. In this situation the procedure is as follows. Firstly, device 1 sends a request to gateway GW1 with a routing command. Until GW1 obtains the final answer (for example the message "executing") from device 4 in cluster 2, GW1 returns a temporary answer for the request from device 1 within a specified minimum response time. Note that, in order to prevent occupation of the gateway subdevice (slave) by a particular master during a request sequence, the device sending a request needs to unlock the gateway by issuing an <end> command after receiving a temporary answer from the gateway. Before the next request from device 1 is received, the gateway subdevice may receive a message to be transferred beyond the cluster from another D2B device (e.g. device 2). Even in such a case, the gateway subdevices must keep the ongoing request sequence by device 1.

The second stage of the procedure is the transfer of the request from GW1 to GW2. This procedure must be executed by means of communications between the gateways according to X-Bus protocols and D2B routing protocols. Thirdly, GW2 sends a request to device 4 which is repeated until a final answer is obtained. The fourth stage is the return by device 4 of the answer (which may be the final answer). The fifth stage is the transfer by GW2 of the obtained answer with the final value to GW1, and the storage by GW1 of the final answer; again, this is executed by means of communication between the devices according to X-Bus protocols. The final stage is the return of the answer with the final value from GW1 to device 1.

Signal Distribution:

As previously mentioned, the signal distribution functionality is optional, although it will be recognised that it is required for an application using av signals via D2B and an X-Bus which can carry av signals. It will also be recognised that, for signal distribution functionality, both the signal connection in AV clusters and signal presentation to X-Bus are required. In the following paragraphs, it is assumed that the X-Bus has AV signal capability.

Within a D2B cluster, the signal connection is made by the AVC subdevice at baseband from a 'source' to 'destination', possibly via one or more switchboxes. If a signal has to be transferred via X-Bus, the local destination will be the gateway. Between different D2B clusters, the related commands and requests are transferred with the routing command: actual switching on the X-Bus has to be done according to X-Bus protocols.

Figure 9:
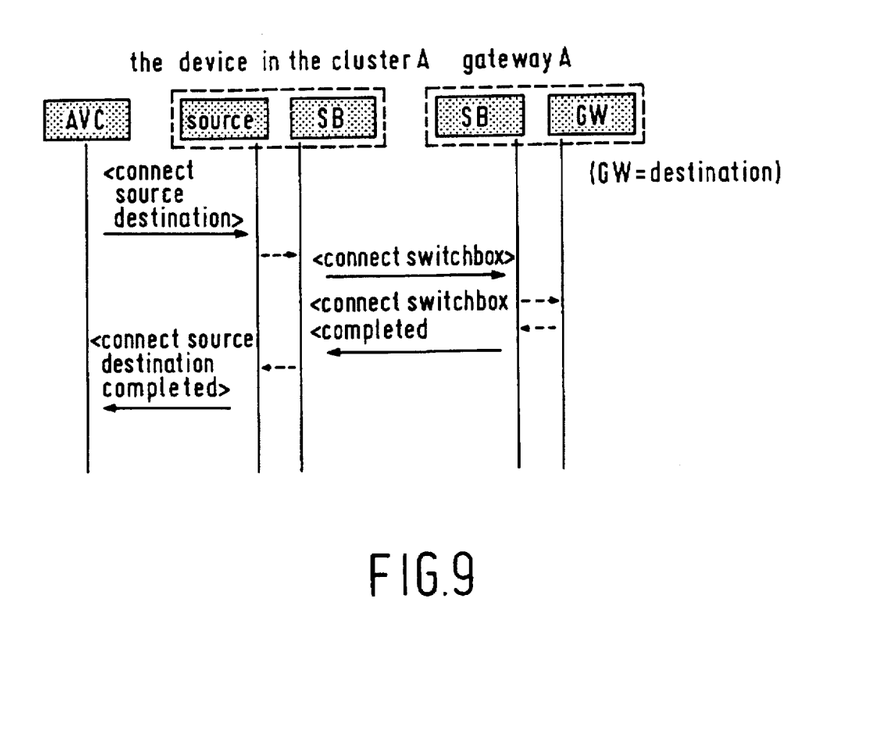
FIGS. 9 and 10 are timing diagrams for signal path building in source and destination clusters.
Figure 10:
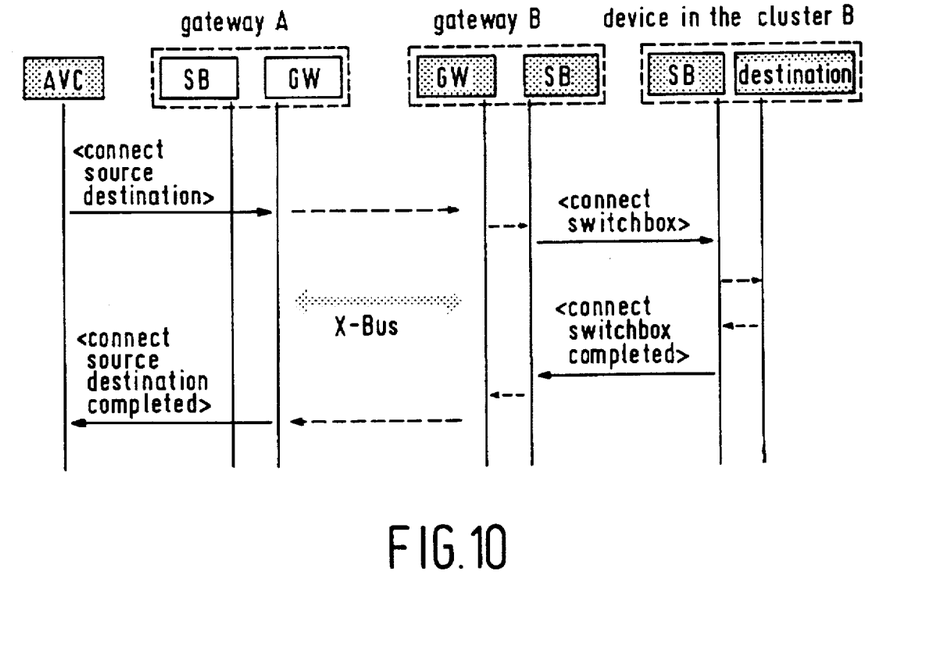

The basic procedures for connection in both source and destination clusters will now be described with reference to FIGS. 9 and 10 which are timing diagrams for signal path building in the source cluster (FIG. 9) and in the source cluster and destination cluster (FIG. 10).

In the connection procedure for a source cluster, the subdevice address of the gateway subdevice is specified as a <destination> in the <connect source destination> command, a <connect switchbox> command, a <connect switchbox completed> command, and a <connect source destination completed> command. After completion of the signal path both in the source cluster and in the destination cluster, the gateway with X-Bus may start switching and building signal path connection on the X-Bus.

If a connection is going to be made to a remote cluster (destination cluster), the connection in the destination cluster is made from the gateway subdevice to the destination subdevice (e.g. a monitor subdevice) in the destination cluster by the AVC subdevice as that which has made a source signal connection. In this case the remote gateway subdevice acts as a source subdevice in the destination cluster. The connection in the destination cluster can be made independently from the connection in the source cluster. The AVC subdevice in the source cluster sends a <connect source destination> command to the gateway subdevice in the destination cluster to establish a connection in the destination cluster. The commands <connect source destination> and <connect source destination completed> are transparently transferred from one cluster to another with the routing command. After the connections both in the source cluster and in the destination cluster are established, the signal can be transferred from the source subdevice in the local cluster to the destination subdevice in the remote cluster.

Figure 11:
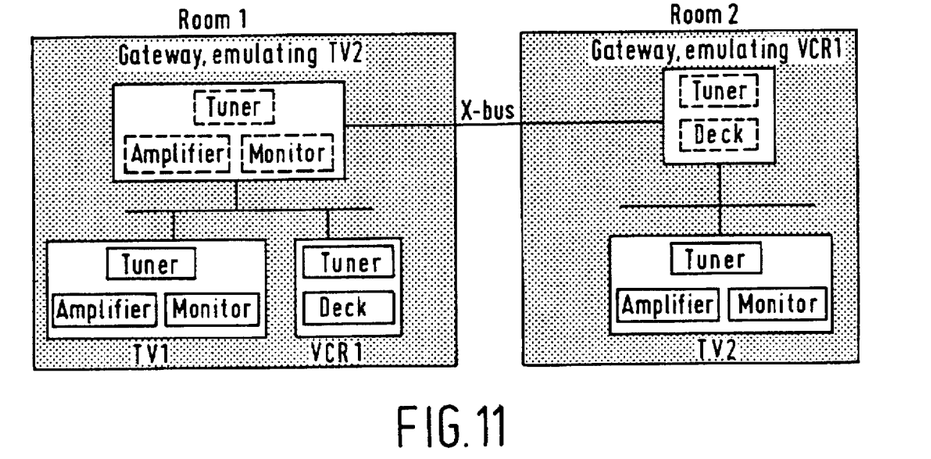
FIGS. 11 and 12 represent emulation by a gateway.
Figure 12:
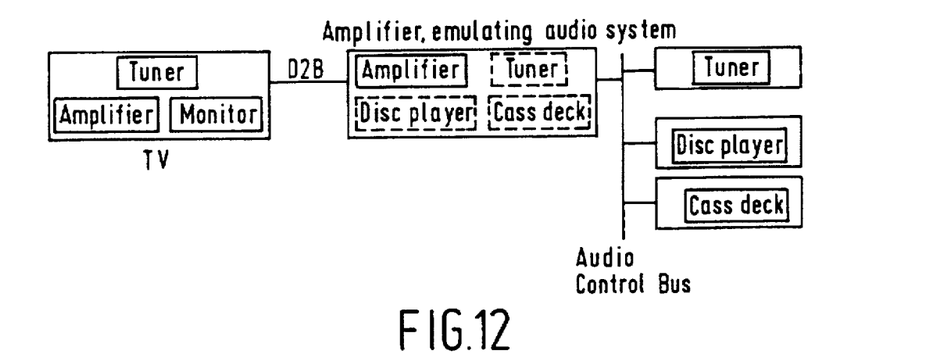

The gateway device is operable to emulate, to each station connected to the first data bus and in accordance with its local set of communications protocols, the behaviour of the or each further station linked to the first bus through the gateway device. FIG. 11 shows a pair of such an "emulating gateways" with the gateway in Room 1 emulating the television in Room 2, and the gateway in Room 2 emulating the VCR in Room 1. In an extension to this system, where a number of devices are connected together in a cluster supporting a first protocol (in this instance Audio control) one of the devices may act as an emulating gateway imitating the AV system as a whole to the television on the D2B bus, as shown in FIG. 12.

Signal presentation depends on the X-Bus protocols and also depends on the applied signal allocation mechanism for the X-Bus, e.g. static-allocation, dynamic-allocation an so on. This means that the signal presentation functionality is necessary for a feature requiring signal distribution but the actual signal switching must be carried out using the X-Bus protocols. The following description refers only to D2B protocols.

In the signal distribution of the destination cluster, the actual procedure including signal connections depends on the type of signal distribution system, and/or whether the destination gateway subdevice has capability to convert the signals from the X-Bus into the baseband signals which can be managed by the D2B protocols, and they are implementor defined.

Figure 13:
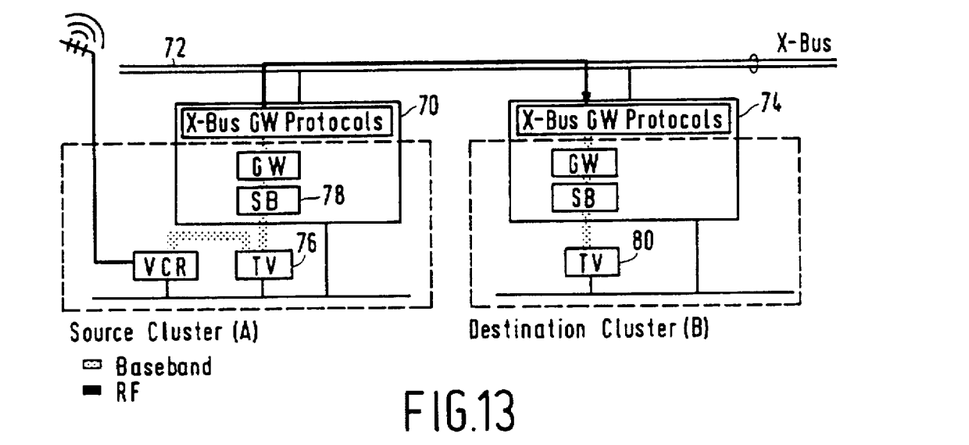
FIGS. 13 to 15 represent methods for RF and baseband signal handling in cluster interconnection.

Three types of signal distribution systems will now be discussed with reference to FIGS. 13 to 15 in which RF signal connections are shown as broad dark lines and baseband paths as broad lighter-coloured lines.

The first type comprises two clusters each supporting the same set of communications protocols and linked by a data bus supporting a further set of communications protocols. A signal path is established between a station of the first cluster and a station of the second cluster as baseband signal paths between each station and its local gateway and as a further signal path between the gateways and selected by one of the gateways from those available within the communications structure supported by the linking data bus. In this first type of distribution system, signal connections in the local cluster (source cluster) and the remote cluster (destination cluster) must be made by the AVC subdevice which is executing an application. The connection procedure both in the source and destination clusters must be done based on the existing D2B connection and protection protocols.

For the signal interchange between an X-Bus and a D2B cluster or vice versa, the signal must be presented by the gateway subdevice. For the signal presentation in the example shown in FIG. 13, the gateway subdevice 70 in the source cluster A plays the role of modulator from baseband to (one of) the frequencies which is applied on the X-Bus signal line. If more than one frequency (or channel) is available, some procedure for selecting one of them may be necessary before signal transmission to the X-Bus 72. On the other hand, the gateway subdevice 74 in the destination cluster acts as a demodulator from X-Bus format (RF) to baseband. An AV signal from the monitor subdevice of TV 76 in cluster A is switched to a switchbox 78 in the gateway 70 and then modulated onto a coaxial cable or an optical fibre. In the remote cluster B, the modulated signal (RF) is put into the gateway 74 and demodulated to the baseband signal, and led to a monitor subdevice (the destination subdevice) in TV 80.

The second type of the system comprises two clusters each supporting the same set of communications protocols and linked by a data bus supporting a further set of communications protocols. A signal path is established between a station of the first cluster and a station of the second cluster as a baseband signal path from a first one of the stations to its local gateway, as a further signal path between the gateways and selected by one of the gateways from those available within the communications structure supported by the linking data bus, and as a Radio Frequency signal path from the other of the stations to its other gateway. This second type applies an aerial type input in the destination cluster, in which system the AV signals are directly led fro X-Bus to destination. The signal connections in the source cluster are made by the executing AVC subdevice as shown in FIG. 9, and the signal connections in the destination cluster are made by alternative means, e.g. manually, such that D2B connection procedures are not necessary. The gateway subdevice in the destination cluster does not need a signal conversion (demodulation) capability, which is dune by the tuner subdevice in the destination device, e.g. a TV.

Figure 14:
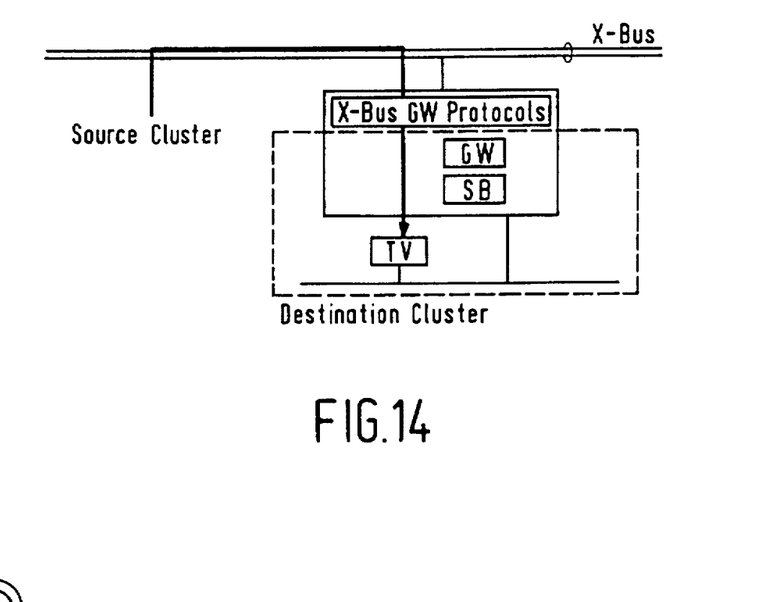
Figure 15:
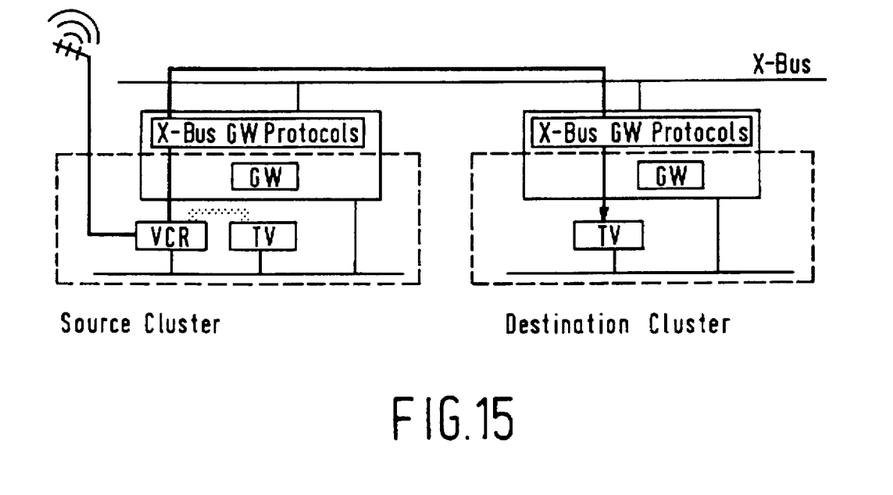

In the example shown in FIG. 14, depending on the frequency (or channel) used for modulation, the destination must be tuned to the appropriate frequency before transmission which may be accomplished by the AVC in the local cluster sending a <frequency> or <channel> command to the tuner subdevice in the remote cluster. If a dynamically-allocated frequency is used for the signal on the X-Bus, the gateway subdevice needs to know the possible frequency on the X-Bus for modulation of the AV signal. In such case, the procedure for detecting a possible frequency on the X-Bus depends on the X-Bus protocols and is implementor defined.

The third type of the system comprises two clusters each supporting the same set of communications protocols and linked by a data bus supporting a further set of communications protocols. A signal path is established between a station of the first cluster and a station of the second cluster as radio frequency signal paths between each station and its local gateway and as a further signal path selected by one of the gateways from those available within the communications structure supported by the linking data bus. This third type of system is the simple signal distribution system (as represented by FIG. 15), and the gateway does not have a signal conversion capability. As the signal distribution within a D2B cluster is based on interconnections of baseband signals, in this type of system, signal connections need be made by another way (e.g. manually) and D2B connection procedures are not necessary. The gateway subdevices act only for transferring commands between clusters.

To avoid errors, the AVC subdevice which is responsible for the application using AV transfer via X-Bus must run the connection procedure in an appropriate manner according to the selected one of the above-mentioned three types of signal distributing system. Accordingly, the following rules are observed by an AVC subdevice making connections beyond its cluster and the gateway subdevice in the destination cluster. Firstly, if the gateway subdevice which does not have the demodulating function receives the connection command from the AVC subdevice in the source cluster, the gateway subdevice should not attempt to make connection in its cluster. Secondly, if the AVC subdevice in the source cluster does not receive a <connect source destination completed> command from the destination cluster, this means that the gateway subdevice in the destination cluster does not have a demodulating function and the signal connections in the destination cluster must be effected by some other means, e.g. manually.

From reading the present disclosure, other variations will be apparent to persons skilled in the art. Such variations may involve other features which are already known in the design, manufacture and use of local communication systems, home entertainment systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either implicitly or explicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A local communication system comprising:
   a plurality of stations interconnected for communicating messages via a first data bus and in accordance with a first set of communication protocols;
   at least one further station not supporting said protocols; and
   a gateway device linking the first data bus and the further station and operable to enable communications therebetween;
   wherein
      the first set of communications protocols specifies a maximum time for reply by a first station to a message sent by a second station, and when a message requiring a response is originated by a station of the first bus system and passed to said further station via the gateway device, the gateway device is configured to (i) generate and send a temporary response to the originating station within a predetermined period less than the specified maximum response time, pending arrival of a response from said further station, (ii) during said pendency provide for passage of a message to or from another station of the first bus system, and (iii) upon arrival of said response from said further station, pass said response to the originating station.

2. A system as claimed in claim 1, wherein the gateway device includes memory means within which a record of at least one message passed thereby is stored.

3. A system as claimed in claim 2, wherein following the sending of said temporary response to the originating station, the gateway device is operable to pass messages from other requesting stations, with the memory means maintaining a record of the message requiring the response.

4. A system as claimed in claim 3, in which the gateway device supports requests from stations connected to the first data bus for information regarding the identity of further gateway devices beyond the gateway and is operable to pass messages to further stations via such further gateway devices, including messages verifying or detecting the presence of stations beyond further gateways.

5. A system as claimed in claim 2, in which the gateway device supports requests from stations connected to the first data bus for information regarding the identity of further gateway devices beyond the gateway and is operable to pass messages to further stations via such further gateway devices, including messages verifying or detecting the presence of stations beyond further gateways.

6. A system as claimed in claim 1, in which the gateway device supports requests from stations connected to the first data bus for information regarding the identity of further gateway devices beyond the gateway and is operable to pass messages to further stations via such further gateway devices, including messages verifying or detecting the presence of stations beyond further gateways.

7. A system as claimed in claim 1, in which the gateway device is operable to emulate, to each station connected to the first data bus and in accordance with the first set of communications protocols, the behaviour of the or each further station linked to the first bus through the gateway device.

8. A system as claimed in claim 1, wherein the plurality of stations are organized into at least first and second clusters, each cluster having a respective local gateway device and supporting the same set of communications protocols, the clusters being linked by a data bus supporting a further set of communications protocols, wherein a signal path is established between a station of the first cluster and a station of the second cluster as baseband signal paths between each station and its local gateway device and a further signal path between the gateway devices, the further signal path being selected by one of the gateway devices from those available within a communications structure supported by the linking data bus.

9. A system as claimed in claim 1, wherein the plurality of stations are organized into at least first and second clusters, each cluster having a local gateway device and supporting the same set of communications protocols, the clusters being linked by a data bus supporting a further set of communications protocols, wherein a signal path is established between a first station of the first cluster and a second station of the second cluster as a baseband signal path from the first station to its local gateway device and a further signal path between the gateway devices and which further signal path is selected by one of the gateways from those available within the communications structure supported by the linking data bus, and a Radio Frequency signal path from the second station to its local gateway device.

10. A system as claimed in claim 1, wherein the plurality of stations are organized into at least first and second clusters, each cluster having a local gateway device supporting the same set of communications protocols, the clusters being linked by a data bus supporting a further set of communications protocols, wherein a signal path is established between a station of the first cluster and a station of the second cluster as radio frequency signal paths between each station and its local gateway device and a further signal path selected by one of the gateway devices from those available within the communications structure supported by the linking data bus.

11. A local communication system comprising:

a. two or more clusters of stations each cluster comprising a plurality of stations interconnected for communicating messages via a respective data bus and in accordance with a respective set of communication protocols, at least one of the respective sets of communication protocols being a first set of communications protocols;

b. a further data bus for interconnecting the clusters, the further data bus not supporting the first set of communication protocols;

c. a plurality of respective gateway devices, one for each cluster, the gateway devices linking the clusters and the further data bus and being operable to enable communications therebetween;

wherein the first set of communications protocols specifies a maximum time for reply by a first station to a message sent by a second station; and each respective gateway device that is coupled to a cluster using the first set of communications protocols is configured (I) in response to a message originating station within that cluster, to generate and send a temporary response to the message originating station within a predetermined period less than the specified maximum response time, pending arrival of a response from a message destination station outside that cluster, (ii) during said pendency provide for passage of a message to or from another station of that cluster, and (iii) upon arrival of said response from said message destination station, pass said response to the message originating station in which a nominated station (the "AV Center")

has knowledge of signal paths in the cluster containing the message originating station;

uses control messages to establish a signal path between the message originating station and the respective gateway device for the cluster containing the message originating station; and provides information to cause establishment of signal paths between the message destination station and the respective gateway device for the cluster containing the message destination station; and between the cluster containing the message originating station and the cluster containing the message destination station via the further bus.

12. A system as claimed in claim 11, in which the gateway of a first cluster is operable to emulate the system outside of its cluster as a station on its cluster data bus and in accordance with the communications protocols supported by that bus.

13. A system as claimed in claim 11, wherein the signal paths between the first station and the respective gateway device of the first cluster; and the second station and the respective gateway device of the second cluster are both baseband signal paths and the "AV Centre" has knowledge of the baseband signal paths in both the first and second clusters and uses control messages for both the first and second clusters to establish the signal paths between the first and second stations and the respective gateways of the first and second clusters.

14. A system as claimed in claim 11, wherein the signal paths between the first station and the respective gateway device of the first cluster; and the second station and the respective gateway device of the second cluster are both baseband signal paths and the "AV Centre"

has knowledge of the baseband signal paths in the first cluster and uses control messages to establish the signal path between the first station and the respective gateway of the first cluster and provides information to allow a nominated station in the second cluster to establish the signal paths between the stations in the second cluster and the respective gateway device for the second cluster.

15. A system as claimed in claim 11, wherein the signal path between the first station and the respective gateway device of the first cluster is a baseband signal path; and the second station and the respective gateway device of the second cluster is a radio frequency channel;

the nominated station (the "AV Centre")

has knowledge of baseband signal paths in the first cluster and uses control messages to establish the signal path in the first cluster between the first station and the respective gateway device of the first cluster, and additionally the AV Centre uses control messages to control the appropriate use of a Radio Frequency channel in the second cluster.

16. A system as claimed in claim 11, wherein the signal path between the first station and the respective gateway device of the first cluster is a baseband signal path; and the second station and the respective gateway device of the second cluster is a radio frequency channel;

the nominated station (the "AV Centre")

has knowledge of baseband signal paths in the first cluster and uses control messages to establish the signal path in the first cluster between the first station and the respective gateway device of the first cluster, and additionally provides information to allow a nominated station in the second cluster to control the appropriate use of a Radio Frequency channel in the second cluster.

17. A system as claimed in claim 11, wherein the signal paths between the first station and the respective gateway device of the first cluster; and the second station and the respective gateway device of the second cluster are both radio frequency channels;

the nominated station uses control messages to control the appropriate use of a Radio Frequency channel in the first and second cluster.

18. A system as claimed in claim 11, wherein the signal paths between the first station and the respective gateway device of the first cluster; and the second station and the respective gateway device of the second cluster are both radio frequency channels; and the nominated station uses control messages to control the appropriate use of a Radio Frequency channel in the first cluster and provides information to allow a nominated station in the second cluster to control the appropriate use of a Radio Frequency channel in the second cluster.

19. A gateway device for use in a local communication system, the system including a plurality of stations interconnected for communicating messages via a first data bus and in accordance with a first set of communication protocols, and at least one further station not supporting said first set of communication protocols; and wherein said first set of communication protocols specifies a maximum time for reply by a first station to a message sent by a second station;

said gateway device comprising means for linking said first data bus and said further station to enable communication therebetween, and means whereby when a message requiring a response is originated by a station of said plurality of stations and passed to said further station via said gateway, said gateway device (i) generates and sends a temporary response to the originating station within a predetermined period less than the specified maximum response time, pending arrival of a response from said further station, (ii) during said pendency, provides for passage of a message to or from another station of the plurality of stations, and (iii) upon arrival of said response from said further station, passes said response to said originating station.

* * * * *